(12) United States Patent
Choudhary

(10) Patent No.: US 11,367,076 B2
(45) Date of Patent: Jun. 21, 2022

(54) ENTITY-BASED CONTROLS FOR VALUE TRANSFER CARDS

(71) Applicant: The Toronto-Dominion Bank, Toronto (CA)

(72) Inventor: Raj Kumar Choudhary, Toronto (CA)

(73) Assignee: The Toronto-Dominion Bank, Toronto (CA)

(*) Notice: Subject to any disclaimer, the term of this patent is extended or adjusted under 35 U.S.C. 154(b) by 118 days.

(21) Appl. No.: 16/445,508

(22) Filed: Jun. 19, 2019

(65) Prior Publication Data

US 2020/0402051 A1 Dec. 24, 2020

(51) Int. Cl.
*G06Q 20/40* (2012.01)
*G06Q 20/34* (2012.01)
(Continued)

(52) U.S. Cl.
CPC ....... *G06Q 20/405* (2013.01); *G06Q 20/3221* (2013.01); *G06Q 20/354* (2013.01); *G06Q 20/363* (2013.01); *G06Q 20/4093* (2013.01)

(58) Field of Classification Search
CPC ...... G06Q 20/10; G06Q 20/405; G06Q 20/40; G06Q 20/401; G06Q 20/04; G06Q 20/02; G06Q 20/322; G06Q 20/105; G06Q 20/12; G06Q 20/20; G06Q 20/28; G06Q 20/32; G06Q 20/3223; G06Q 20/367; G06Q 20/3829; G06Q 20/387; G06Q 30/02; G06Q 40/00; G06Q 40/02; G06Q 20/027; G06Q 20/102; G06Q 20/3255; G06Q 20/351;
(Continued)

(56) References Cited

U.S. PATENT DOCUMENTS 7,389,531 B2 6/2008 Fransdonk
7,742,994 B1 6/2010 Gupta
(Continued)

FOREIGN PATENT DOCUMENTS

WO 2013073971 5/2013

OTHER PUBLICATIONS

Diaz-santiago, Sandra; Rodriguez-henriquez, Lil Marla; Chakraborty, Debrup; A cryptographic study of tokenization systems; Located at: https://eprint.iacr.org/2014/602.pdf; Retrieved on Jun. 18, 2019 and dated 2014.

*Primary Examiner* — Alexander G Kalinowski
*Assistant Examiner* — Sanjeev Malhotra
(74) *Attorney, Agent, or Firm* — Rowand LLP

(57) ABSTRACT

In an aspect, a computing system is configured to: send, to a transfer rail server, a request for stored card data associated with a value transfer card; receive stored card data identifying an entity having a stored representation of the value transfer card; provide user interface data to a client device, the user interface data causing the client device to display a user interface that includes an entity listing that is based on the stored card data, the user interface including a selectable option to add an entity-based control to the identified entity; receive, from the client device, an instruction to apply an entity-based control to an identified one of the entities in the stored card data; and in response to receiving the instruction to apply the entity-based control, implement the entity-based control to affect use of the value transfer card by the identified entity and not affect use of the value transfer card by other entities.

18 Claims, 8 Drawing Sheets

(51) Int. Cl.
 *G06Q 20/36* (2012.01)
 *G06Q 20/32* (2012.01)

(58) Field of Classification Search
 CPC .. G06Q 20/354; G06Q 20/36; G06Q 20/3672;
  G06Q 20/3674; G06Q 20/382; G06Q
  20/3821; G06Q 20/38215; G06Q
  20/3823; G06Q 20/3825; G06Q 20/385;
  G06Q 20/4012; G06Q 20/403; G06Q
  20/409; G06Q 2220/00; G06Q 30/0225;
  G06Q 30/0233; G06Q 30/04
 USPC ... 705/14.26, 17, 30, 39, 41, 44, 64, 71, 78;
  348/207.1; 713/172; 455/407; 235/375
 See application file for complete search history.

(56) References Cited

U.S. PATENT DOCUMENTS

| | | | |
|---|---|---|---|
| 7,743,979 B2 | 6/2010 | Fredman | |
| 2003/0145205 A1* | 7/2003 | Sarcanin | G06Q 20/3821 |
| | | | 713/172 |
| 2006/0213968 A1* | 9/2006 | Guest | H04M 15/68 |
| | | | 235/375 |
| 2007/0027804 A1* | 2/2007 | Vega | G06Q 20/14 |
| | | | 705/39 |
| 2007/0094149 A1* | 4/2007 | Hochfield | G07F 7/1008 |
| | | | 705/64 |
| 2007/0156611 A1* | 7/2007 | Gupta | G06Q 20/12 |
| | | | 705/78 |
| 2007/0214079 A1* | 9/2007 | Mears | G06Q 40/02 |
| | | | 705/53 |
| 2008/0003977 A1* | 1/2008 | Chakiris | G06Q 20/322 |
| | | | 455/407 |
| 2008/0313061 A1* | 12/2008 | Eugenio Donato Renato Limlengco | G06Q 20/40 |
| | | | 705/30 |
| 2010/0268645 A1* | 10/2010 | Martino | G06Q 20/10 |
| | | | 705/44 |
| 2011/0196787 A1* | 8/2011 | Alroy | G06Q 20/105 |
| | | | 705/41 |
| 2012/0054013 A1* | 3/2012 | Anderson | G06Q 20/354 |
| | | | 705/14.26 |
| 2012/0239565 A1* | 9/2012 | Davis | G06Q 20/12 |
| | | | 705/41 |
| 2012/0290420 A1* | 11/2012 | Close | G06Q 20/20 |
| | | | 705/16 |
| 2013/0036055 A1* | 2/2013 | Mears | G06Q 30/02 |
| | | | 705/44 |
| 2013/0057709 A1* | 3/2013 | Joung | G06F 13/385 |
| | | | 348/207.1 |
| 2014/0040118 A1* | 2/2014 | Miller | G06Q 20/351 |
| | | | 705/35 |
| 2014/0108260 A1 | 4/2014 | Poole et al. | |
| 2014/0108263 A1* | 4/2014 | Ortiz | G06Q 20/36 |
| | | | 705/44 |
| 2014/0372308 A1 | 12/2014 | Sheets | |
| 2015/0058227 A1 | 2/2015 | Dua | |
| 2015/0269582 A1 | 9/2015 | Simmons | |
| 2016/0012428 A1 | 1/2016 | Haldenby et al. | |
| 2016/0048821 A1 | 2/2016 | Sprecher | |
| 2016/0050259 A1 | 2/2016 | Banerjee et al. | |
| 2016/0180304 A1* | 6/2016 | Carriles | G06Q 20/405 |
| | | | 705/44 |
| 2016/0260072 A1* | 9/2016 | Badger | G06Q 30/0222 |
| 2017/0053301 A1 | 2/2017 | Khan et al. | |
| 2017/0228733 A1* | 8/2017 | Jordan | G06Q 20/401 |
| 2017/0323295 A1* | 11/2017 | Kranzley | G06Q 30/0611 |
| 2017/0357964 A1 | 12/2017 | Subrahmanyam et al. | |
| 2018/0096378 A1 | 4/2018 | Moniz et al. | |
| 2019/0066073 A1 | 2/2019 | Yen et al. | |
| 2020/0111080 A1* | 4/2020 | Metcalfe | H04L 9/3255 |
| 2020/0364760 A1* | 11/2020 | Sabat | G06Q 20/401 |

* cited by examiner

US 11,367,076 B2

ENTITY-BASED CONTROLS FOR VALUE TRANSFER CARDS

TECHNICAL FIELD

The present application relates to value transfer cards and, more particularly, to systems and methods for managing value transfer cards that have been previously stored by third party computer systems.

BACKGROUND

Value transfer cards, such as credit cards, are often shared with third party computer systems for future use; for example, future electronic commerce transactions. Value transfer cards are typically stored by billers in either "card on file" form or tokenized form. Card-on-file form may involve storing a unique number associated with the value transfer card (e.g., a primary account number or "PAN"), a date and verification information, such as credit card verification (CCV) information. Tokenized form involves the storage of a tokenized version of the value transfer card.

Value transfer cards may also be stored on a user's device, including on a mobile device such as a smartphone. Such storage of value transfer cards may enable smartphone payments, such as near field communication (NFC) payments.

Over time, a particular value transfer card may be stored in numerous locations and tracking and managing use of the value transfer card may become increasingly difficult.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
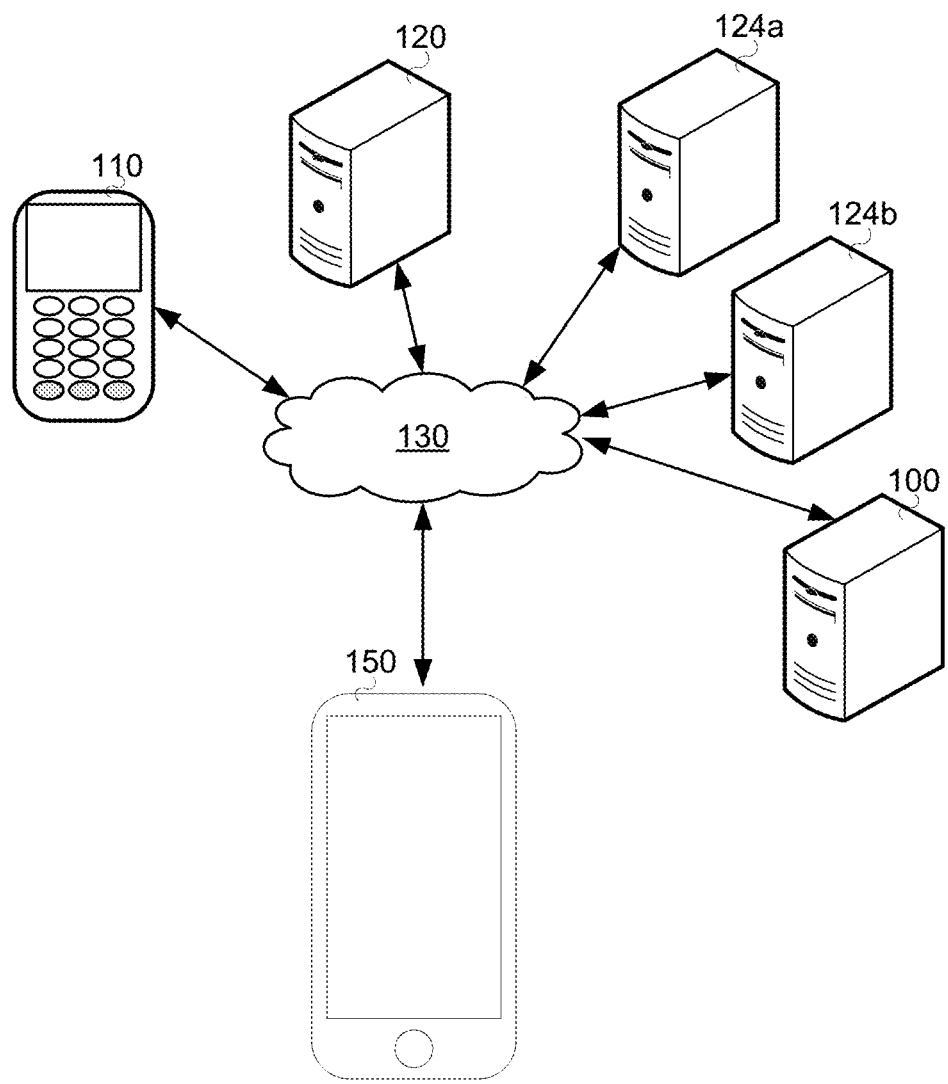
FIG. 1 is a schematic operation diagram illustrating an operating environment of an example embodiment.

According to the subject matter of the present application, there may be provided a method including: sending, to a transfer rail server, a request for stored card data associated with a value transfer card; receiving, from the transfer rail server, stored card data, the stored card data identifying an entity having a stored representation of the value transfer card; providing user interface data to a client device, the user interface data causing the client device to display a user interface that includes an entity listing that is based on the stored card data, the user interface including a selectable option to add an entity-based control to the identified entity; receiving, from the client device, an instruction to apply an entity-based control to an identified one of the entities in the stored card data; and, in response to receiving the instruction to apply the entity-based control, implementing the entity-based control to affect use of the value transfer card by the identified entity and not affect use of the value transfer card by other entities.

In this way, an entity-based control may be provided. The entity-based control only affects the entity associated with the entity-based control and does not affect other entities.

In some implementations, implementing the entity-based control to affect use of the value transfer card by the identified entity may include sending, to the transfer rail server, an instruction to apply the entity-based control, the instruction identifying the identified entity and the value transfer card.

In some implementations, the entity-based control may include a stop transfer control that prohibits the identified entity from processing a transfer using the value transfer card until the stop transfer control is removed.

In some implementations, the entity-based control may include a location-based use restriction that prevents use of the value transfer card by the identified entity at a first location and allows use of the value transfer card by the identified entity at a second location.

In some implementations, the first location may include a location associated with the identified entity.

In some implementations, the entity-based control may prevent use of the value transfer card by the identified entity outside of a home country associated with the identified entity.

In some implementations, the entity-based control may include a control based on a threshold, and the threshold may be included in the instruction to apply the entity-based control.

In some implementations, the threshold may define a maximum transfer value for a time period.

In some implementations, the threshold may define a maximum transfer value for a single transfer of value.

In some implementations, the entity-based control may include a time-based restriction preventing use of the value transfer card by the identified entity on a first date and allowing the use of the value transfer card by the identified entity on a second date.

In some implementations, the entity-based control may specify one or more of: a date on which the value transfer card may be used by the identified entity; a range of dates on which the value transfer card may be used by the identified entity; an end date after which the value transfer card may not be used by the identified entity; and a recurring date range during which the value transfer card may be used by the identified entity.

In some implementations, the instructions may further configure the processor to update the user interface at the client device to indicate that the entity-based control has been applied and to include a selectable option to remove the entity-based control.

In some implementations, the entity listing may include an entity having stored a tokenized representation of the value transfer card and an entity having stored a non-tokenized representation of the value transfer card and the selectable option to add the entity-based control may be provided for the entity having stored the tokenized representation of the value transfer card and not the entity having stored the non-tokenized representation of the value transfer card.

In another aspect, there may be provided a computing system. The computing system may include a communications module and a processor coupled to the communications module. The computing system may include a memory coupled to the processor. The memory may store processor-executable instructions which, when executed, configure the processor to perform a method described herein.

For example, in one aspect, there may be provided a computing system. The computing system may include a communications module and a processor coupled to the communications module. The computing system may include a memory coupled to the processor. The memory may store processor-executable instructions which, when executed, configure the processor to: send, via the communications module and to a transfer rail server, a request for stored card data associated with a value transfer card; receive, via the communications module and from the transfer rail server, stored card data, the stored card data identifying an entity having a stored representation of the value transfer card; provide user interface data to a client device, the user interface data causing the client device to display a user interface that includes an entity listing that is based on the stored card data, the user interface including a selectable option to add an entity-based control to the identified entity; receive, via the communications module and from the client device, an instruction to apply an entity-based control to an identified one of the entities in the stored card data; and in response to receiving the instruction to apply the entity-based control, implement the entity-based control to affect use of the value transfer card by the identified entity and not affect use of the value transfer card by other entities.

In another aspect, there may be provide a non-transitory computer-readable storage medium. The non-transitory computer-readable storage medium may include processor-executable instructions which, when executed, configure a processor to perform a method described herein. For example, in an aspect, the processor executable instructions may, when executed, configure the processor to: send, to a transfer rail server, a request for stored card data associated with a value transfer card; receive, from the transfer rail server, stored card data, the stored card data identifying an entity having a stored representation of the value transfer card; provide user interface data to a client device, the user interface data causing the client device to display a user interface that includes an entity listing that is based on the stored card data, the user interface including a selectable option to add an entity-based control to the identified entity; receive, from the client device, an instruction to apply an entity-based control to an identified one of the entities in the stored card data; and in response to receiving the instruction to apply the entity-based control, implement the entity-based control to affect use of the value transfer card by the identified entity and not affect use of the value transfer card by other entities.

In another aspect, there may be provided a method. The method may include: obtaining, from a transfer rail server, stored card data, the stored card data identifying one or more entities having a stored representation of a value transfer card; obtaining, from the transfer rail server, data indicating a time of last use of the value transfer card by one or more of the identified entities; identifying a dormant entity based on the data indicating the time of last use of the value transfer card by the one or more of the identified entities; sending, to a client device associated with the value transfer card, a notification of the dormant entity, the notification providing a prompt to disable the value transfer card for the dormant entity; receiving, from the client device, a command in response to the notification; and when the command includes a request to disable the value transfer card for the dormant entity, disabling the value transfer card for the dormant entity to prevent further use of the value transfer card by the dormant entity.

In this way, value transfer cards may be disabled when such value transfer cards are not being used. Notably, disabling such value transfer cards may decrease the risk of fraud since proliferation of stored representations of a value transfer card increases the risk of fraud.

In some implementations, identifying a dormant entity based on the data indicating the time of last use may include performing a threshold-based comparison based on a time of last use and a current date.

In some implementations, the threshold-based comparison may be performed based on a first threshold. The method may also include: when the command is not a request to disable the value transfer card for the dormant entity: obtaining, from the transfer rail server, further data indicating an updated time of last use of the value transfer card by one or more of the identified entities; and determining that the dormant entity for which the notification was sent has entered a further dormancy period by performing a threshold-based comparison based on the updated time of last use, the current date, and a second threshold, wherein the second threshold represents a longer time period than the first threshold.

In some implementations, the method may include, in response to determining that the dormant entity has entered a further dormancy period, automatically disabling the value transfer card for the dormant entity.

In some implementations, the method may include, in response to determining that the dormant entity has entered a further dormancy period, sending a further notification to the client device associated with the value transfer card. The further notification may provide a further prompt to disable the value transfer card for the dormant entity.

In some implementations, the command may be a snooze command and the method may further include, after receiving the snooze command: following a snooze period, determining, by obtaining further data from the transfer rail server, that the dormant entity has remained dormant during the snooze period; and sending a further notification of the dormant entity to the client device associated with the value transfer card, the further notification providing a further prompt to disable the value transfer card for the dormant entity.

In some implementations, the snooze command may include the snooze period and the snooze period may be based on input received at the client device.

In some implementations, the method may include, receiving, from the client device, input of a threshold for identifying a dormant entity. The identifying may be based on the threshold.

In some implementations, the method may include providing user interface data to the client device. The user interface data may cause the client device to display a user interface that includes an entity listing identifying entities having a stored representation of a value transfer card. The entity listing may include the dormant entity and the user interface may include a dormant card indication in association with the dormant entity.

In some implementations, the dormant entity may be an entity having stored a tokenized representation of the value transfer card, and notifications of dormant entities may only be sent for entities having stored tokenized representations of the value transfer card.

In another aspect, a computing system is described. The computing system includes a communications module and a processor coupled to the communications module. The computing system further includes a memory coupled to the processor. The memory may store processor-executable instructions which, when executed, configure the processor to perform a method described herein. For example, the instructions may configure the processor to: obtain, via the communications module and from a transfer rail server, stored card data, the stored card data identifying one or more entities having a stored representation of a value transfer card; obtain, via the communications module and from the transfer rail server, data indicating a time of last use of the value transfer card by one or more of the identified entities; identify a dormant entity based on the data indicating the time of last use of the value transfer card by the one or more of the identified entities; send, via the communications module and to a client device associated with the value transfer card, a notification of the dormant entity, the notification providing a prompt to disable the value transfer card for the dormant entity; receive, via the communications module and from the client device, a command in response to the notification; and when the command includes a request to disable the value transfer card for the dormant entity, disable the value transfer card for the dormant entity to prevent further use of the value transfer card by the dormant entity.

In another aspect, there may be provide a non-transitory computer-readable storage medium. The non-transitory computer-readable storage medium may include processor-executable instructions which, when executed, configure a processor to perform a method described herein. For example, in an aspect, the processor executable instructions may, when executed, configure the processor to: obtain, from a transfer rail server, stored card data, the stored card data identifying one or more entities having a stored representation of a value transfer card; obtain, from the transfer rail server, data indicating a time of last use of the value transfer card by one or more of the identified entities; identify a dormant entity based on the data indicating the time of last use of the value transfer card by the one or more of the identified entities; send, to a client device associated with the value transfer card, a notification of the dormant entity, the notification providing a prompt to disable the value transfer card for the dormant entity; receive, from the client device, a command in response to the notification; and when the command includes a request to disable the value transfer card for the dormant entity, disable the value transfer card for the dormant entity to prevent further use of the value transfer card by the dormant entity.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Example embodiments of the present application are not limited to any particular operating system, system architecture, mobile device architecture, server architecture, or computer programming language.

FIG. 1 is a schematic operation diagram illustrating an operating environment of an example embodiment.

As illustrated, a transfer rail server 120 communicates with remote computing devices via a network 130. The remote computing devices may take a variety of forms. For example, as illustrated, the transfer rail server 120 may communicate with one or more point-of-sale terminals 110 and/or one or more other computing devices such as, for example, one or more transfer initiation systems 124a, 124b. The transfer initiation systems 124a, 124b may be or include, for example, electronic commerce (i.e., e-commerce) systems. An e-commerce system may be, for example, a server associated with an electronic commerce website such as an online store that sells or facilitates the sale of goods and/or services online. The transfer initiation systems 124a, 124b may, additionally or alternatively, include one or more computer systems that are not e-commerce servers. For example, the transfer initiation systems 124a, 124b may be or include utility or subscription or membership computing systems. For example, the transfer initiation systems may include, computing devices associated with one or more of: telephone services, internet services, periodicals including magazines and newspapers, club memberships such as fitness memberships, utility services including, for example, water services, gas services, hydro services, etc.

The transfer rail server 120 may be a computing system that facilitates electronic funds transfer and may, in at least some embodiments, be referred to as a payment rails server. By way of example, the transfer rail server 120 may be a Visa™, Mastercard™, or American Express™ server. The transfer rail server 120 may be associated with a particular brand of value transfer cards. More particularly, the transfer rail server 120 may facilitate payment processing for a particular brand of payment card, such as a particular brand of credit and/or charge card. By way of example, in some embodiments, the transfer rail server 120 may only process Visa transactions. The transfer rail server 120 may also, in at least some embodiments, be referred to as a credit card network server.

The transfer rail server 120 communicates with a computing system, such as an issuer computing system 100. The issuer computing system 100 may be, for example, a computer system associated with a financial institution, such as a bank, that issued a credit and/or charge card. Put differently, the issuer computing system 100 is associated with a value transfer card issuer. For example, the issuer computing system 100 may be operated or managed by the value transfer card issuer.

A value transfer card may be or include a credit card or charge card. The value transfer card may have certain associated data. For example, the value transfer card may be associated with a primary account number (PAN), a verification number such as a credit card verification (CCV) number and/or an expiry date. The value transfer card may be used by the point-of-sale terminal 110 or another transfer initiation system 124a, 124b for processing a transfer of value from a cardholder to an entity associated with such systems.

In order to process a transfer of value using the value transfer card, the POS terminal or other transfer initiation system 124a, 124b may communicate with the transfer rail server 120. For example, the transfer initiation system 124a, 124b may send, to the transfer rail server 120, a transfer request. The transfer request may specify, for example, an amount of value associated with the request. The transfer request may also include or be associated with one or more credentials associated with a value transfer card. The credentials may include, for example, the PAN, expiry date and/or verification number for the value transfer card. Other metadata may also be included in the transfer request such as, for example, an entity identifier such as a merchant identifier, location information specifying a location at which the transfer initiation system 124a, 124b purports to be located, and/or other information.

The credential may take other forms. For example, the credential may include a token. A token may be a non-decryptable piece of data that is used to represent, by reference, value transfer card data. Tokens may be issued by a tokenization service, which may be included in the transfer rail server 120 or may be a separate system. The tokenization service and/or the transfer rail server 120 stores a mapping of a token to associated information such as, for example, value transfer card data. For example, the token may be mapped to one or more of an account number such as a PAN, a date such as an expiry date, verification data such as a CCV number, and/or a token holder. The token holder may identify an entity that the token was issued to and/or is associated with. The entity may, for example, be the transfer rail server 120. For example, the transfer rail server 120 may permit one or more third party systems (e.g., the transfer initiation system 124a, 124b) to obtain and store a token for a particular value transfer card. The token is a representation of the value transfer card and may be stored by the transfer initiation system 124a, 124b for future use in issuing value transfer requests. The token may be unique to the entity to which it is issued. That is, different entities that receive tokens for the same value transfer card may receive different tokens and the transfer rail server 120 and/or the tokenization service may track which entity received which token so that an entity that issued a value transfer request that includes a token may be identified.

After the transfer rail server 120 receives a value transfer request, it may communicate with an issuer computing system 100 to request approval of the value transfer request. The request for approval may include, for example, information included in or obtained from the value transfer request, such as the amount of the value transfer request. The request for approval may include information determined based on the token. For example, the PAN may be included in the request. The transfer rail server 120 receives a response to the request for approval (e.g., either an indication of approval or an indication of denial) and sends a corresponding message to the transfer initiation system 124a, 124b.

Accordingly, a transfer initiation system 124a, 124b may use a credential associated with a value transfer card in order to initiate a transfer. In some instances, the transfer initiation system 124a, 124b may store the credential for future use. For example, the value transfer initiation system 124a, 124b may store a representation of a value transfer card in a memory associated with the value transfer initiation system 124a, 124b. The representation of the value transfer card may either be a "card on file" representation of the value transfer card or a tokenized representation of the value transfer card. In the card on file representation, the value transfer initiation system 124a, 124b stores the PAN, expiry date and, in some instances, the verification information associated with the value transfer card. In the tokenized representation, the value transfer initiation system 124a, 124b stores a token of the type referred to above.

As card holders use their value transfer card with various third party entities, representations of the value transfer card may be stored at numerous locations. While two transfer initiation systems 124a, 124b are illustrated in FIG. 1, the number of transfer initiation systems 124a, 124b having a stored representation of the value transfer card may be much greater. This may complicate a card holder's ability to manage their value transfer card. Various systems and methods described herein may assist a user in managing their value transfer card even when it has been distributed to multiple third party systems such that there are representations of the value transfer card stored at numerous third party systems at various geographic locations.

The issuer computing system 100 may communicate with a client device 150 via the network 130 in order to allow the client device 150 to be used in managing the value transfer card. More specifically, the issuer computing system 100 and the client device 150 may cooperate to provide a card management user interface on an output device, such as a display, of the client device 150. A user may interact with the card management user interface in order to input instructions to the client device 150. At least some such instructions may cause the client device 150 to send a management request or command to the issuer computing system 100. The management request or command may take various forms. For example, in some instances, as will be explained in greater detail below, the management request or command may be an instruction to apply an entity-based control to an identified entity. The entity-based control is a control that prevents the entity from performing certain operations using the value transfer card but does not restrain other entities from performing such operations.

By way of further example, the management request or command may be a request to disable the value transfer card for a dormant entity. For example, the management user interface may assist a user in identifying third party entities that have stored a representation of a value transfer card which have not been used in at least a threshold period of time. The management user interface may allow a user to request that the value transfer card be disabled for such dormant entities.

Other management features and functions may also be provided by the management user interface.

The client device 150 may also include a stored representation of the value transfer card. For example, a token may be stored in secure memory of the client device 150 to allow the client device 150 to be used in initiate a transfer of value. For example, the client device may include a near field communication (NFC) subsystem which may be used to send the token to the POS terminal 110 in order to initiate or complete a transaction.

The issuer computer system 100, client device 150, transfer initiation systems 124a, 124b, and the transfer rail server 120 may be in geographically disparate locations. Put differently, each of the issuer computer system 100, point-of-sale terminal 110, client device 150, transfer initiation systems 124a, 124b, and the transfer rail server 120 may be remote from others of the issuer computer system 100, client device 150, transfer initiation systems 124a, 124b, and the transfer rail server 120.

The issuer computer system 100, point-of-sale terminal 110, client device 150, transfer initiation systems 124a, 124b, and the transfer rail server 120 are each both a computer system and a computing device.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, or the like. Additionally or alternatively, the network 130 may be or may include one or more payment networks. The network 130 may, in some embodiments, include a plurality of distinct networks. For example, communications between certain of the computer systems may be over a private network whereas communications between other of the computer systems may be over a public network, such as the Internet.

Figure 2:
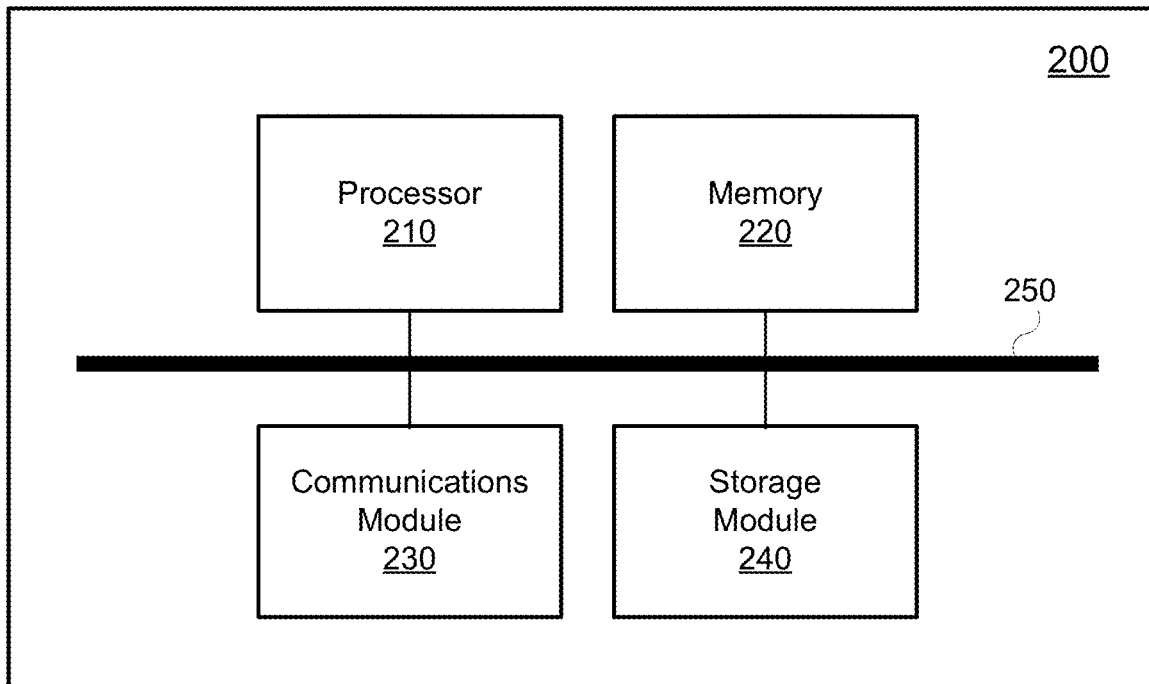
FIG. 2 is high-level schematic diagram of a computing device.

Referring now to FIG. 2, a high-level operation diagram of an example computing device 200 will now be described. The example computing device 200 may be exemplary of the issuer computer system 100, point-of-sale terminal 110, client device 150, transfer initiation systems 124a, 124b, and/or the transfer rail server 120.

The example computing device 200 includes a variety of modules. For example, as illustrated, the example computing device 200 may include a processor 210, a memory 220, a communications module 230, and/or a storage module 240. As illustrated, the foregoing example modules of the example computing device 200 are in communication over a bus 250.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 200.

The communications module 230 allows the example computing device 200 to communicate with other computing devices and/or various communications networks. For example, the communications module 230 may allow the example computing device 200 to send or receive communications signals. Communications signals may be sent or received according to one or more protocols or according to one or more standards. For example, the communications module 230 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 230 may allow the example computing device 200 to communicate using near-field communication (NFC), via Wi-Fi™, using Bluetooth™ or via some combination of one or more networks or protocols. In some embodiments, all or a portion of the communications module 230 may be integrated into a component of the example computing device 200. For example, the communications module may be integrated into a communications chipset.

The storage module 240 allows the example computing device 200 to store and retrieve data. In some embodiments, the storage module 240 may be formed as a part of the memory 220 and/or may be used to access all or a portion of the memory 220. Additionally or alternatively, the storage module 240 may be used to store and retrieve data from persisted storage other than the persisted storage (if any) accessible via the memory 220. In some embodiments, the storage module 240 may be used to store and retrieve data in a database. A database may be stored in persisted storage. Additionally or alternatively, the storage module 240 may access data stored remotely such as, for example, as may be accessed using a local area network (LAN), wide area network (WAN), personal area network (PAN), and/or a storage area network (SAN). In some embodiments, the storage module 240 may access data stored remotely using the communications module 230. In some embodiments, the storage module 240 may be omitted and its function may be performed by the memory 220 and/or by the processor 210 in concert with the communications module 230 such as, for example, if data is stored remotely. The storage module may also be referred to as a data store.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

The computing device 200 will include other components apart from those illustrated in FIG. 2 and the specific component set may differ based on whether the computing device 200 is operating as the issuer computer system 100, point-of-sale terminal 110, client device 150, transfer initiation systems 124a, 124b, and the transfer rail server 120. For example, the computing device 200 may include one or more input modules, which may be in communication with the processor 210 (e.g., over the bus 250). The input modules may take various forms including, for example, a mouse, a microphone, a camera, a touchscreen overlay, a button, a sensor, etc. By way of further example, the computing devices 200 may include one or more output modules, which may be in communication with the processor 210 (e.g., over the bus 250). The output modules include one or more display modules which may be of various types including, for example, liquid crystal displays (LCD), light emitting diode displays (LED), cathode ray tube (CRT) displays, etc. By way of further example, the output modules may include a speaker.

Figure 3:
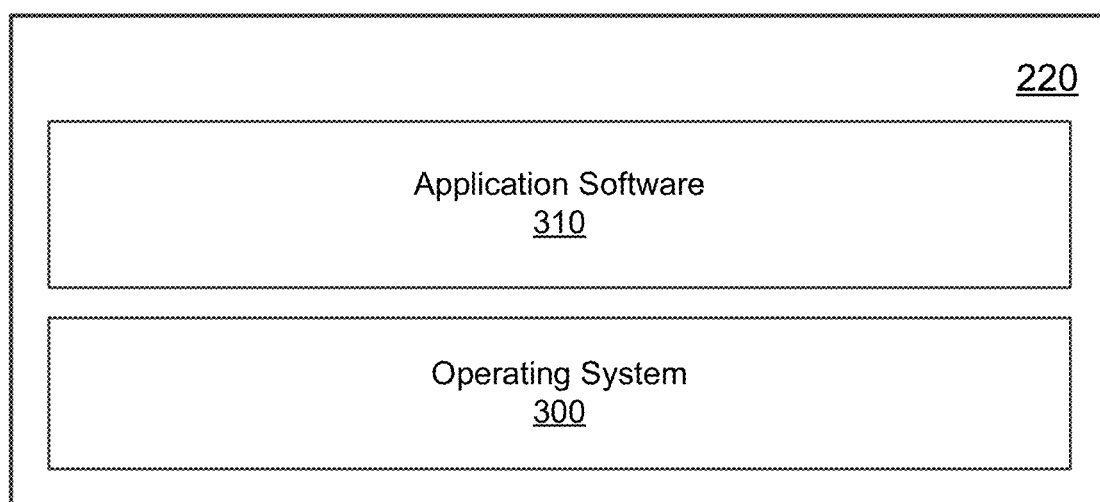
FIG. 3 shows a simplified organization of software components stored in a memory of the computing device of FIG. 2.

FIG. 3 depicts a simplified organization of software components stored in the memory 220 of the example computing device 200 (FIG. 2). As illustrated, these software components include an operating system 300 and an application 310.

The operating system 300 is software. The operating system 300 allows the application 310 to access the processor 210 (FIG. 2), the memory 220, and the communications module 230 of the example computing device 200 (FIG. 2). The operating system 300 may be, for example, Google™ Android™, Apple™ iOS™, UNIX™, Linux™, Microsoft™ Windows™, Apple OSX™ or the like.

The application 310 adapts the example computing device 200, in combination with the operating system 300, to operate as a device performing a particular function. For example, the application 310 may cooperate with the operating system 300 to adapt a suitable embodiment of the example computing device 200 to operate as the issuer computer system 100, point-of-sale terminal 110, client device 150, transfer initiation systems 124a, 124b, or the transfer rail server 120.

While a single application 310 is illustrated in FIG. 3, in operation the memory 220 may include more than one application 310 and different applications 310 may perform different operations.

Figure 4:
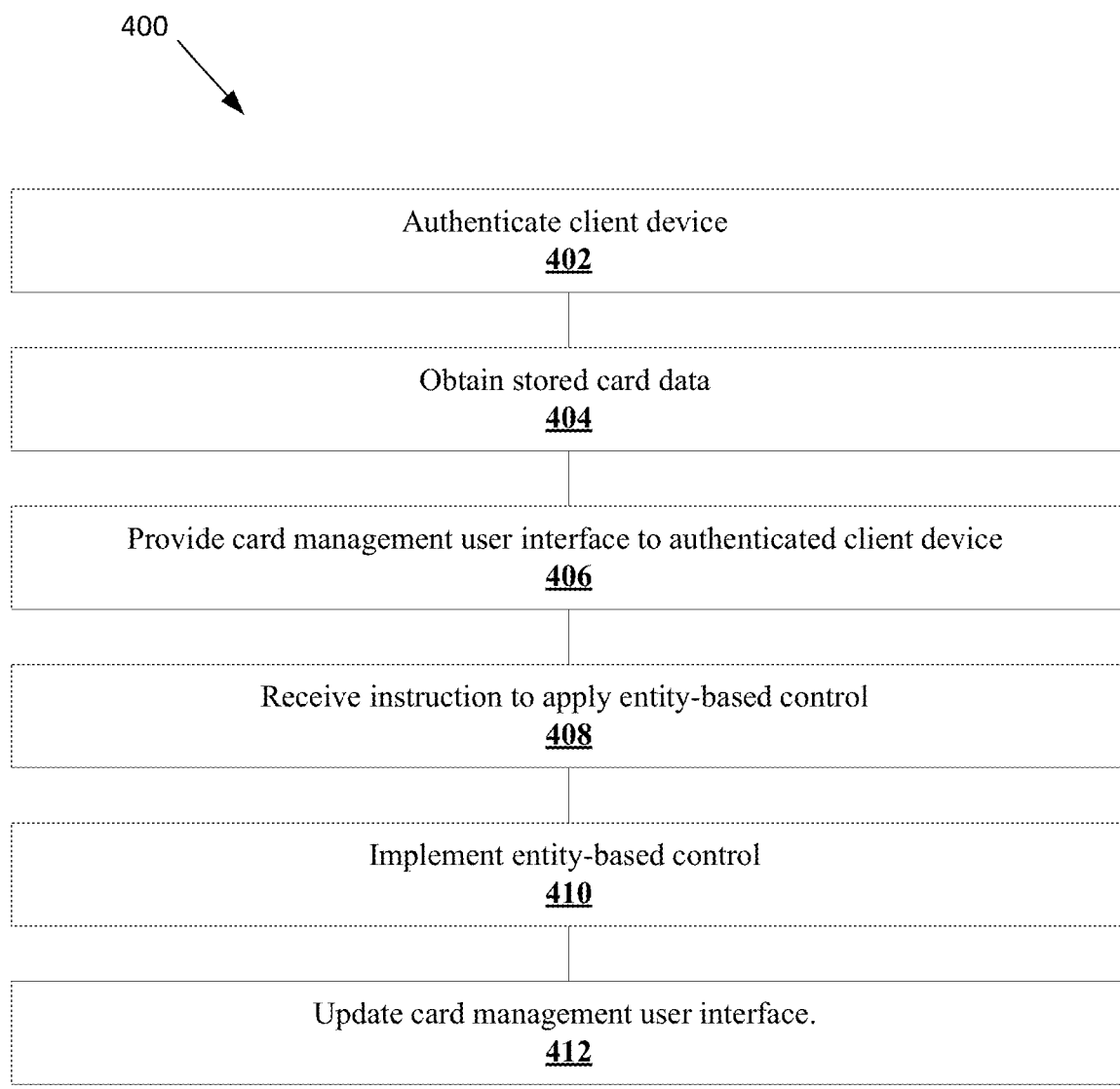
FIG. 4 is a flowchart showing operations performed by an issuer computer system.

FIG. 4 provides a flowchart depicting example operations performed in a method 400 of managing a card stored remotely by a third party entity. The third party entity may be a transfer initiation system 124a, 124b having a stored representation of a value transfer card.

Operations starting with an operation 402 and continuing onward are performed by the processor 210 (FIG. 2) of a computing device 200 executing software comprising instructions such as may be stored in the memory 220 of the computing device 200. For example, the operations of the method 400 may be performed by the issuer computer system 100. More particularly, processor-executable instructions may, when executed, configure a processor 210 of the issuer computer system 100 to perform the method 400.

In performing the method 400, the issuer computer system 100 may cooperate with a transfer rail server 120. The transfer rail server may store card data for a value transfer card. The card data may, for example, identify one or more entities that have a stored representation of a value transfer card. The entities may be transfer initiation systems 124a, 124b. One or more of the entities may store the representation of the value transfer card in card-on-file format. Additionally or alternatively, one or more of the entities may store the representation of the card in tokenized format (i.e., by storing a token). Thus, prior to performance of the method 400, the transfer rail server 120 may have already stored card data. Such data may be stored by the transfer rail server 120 when a token is issued to such transfer initiation systems 124a, 124b and/or when transfers are initiated by one of the transfer initiation systems 124a, 124b. For example, when a token is issued by a transfer rail server 120 to a transfer initiation system, the transfer rail server 120 may store card data to reflect the fact that a representation of a value transfer card is now stored by that transfer rail server 120. Thus, the transfer rail server may track transfer initiation systems that have stored a tokenized representation of a value transfer card.

The transfer rail server may also track transfer initiation systems that have stored a card-on-file representation of a value transfer card. For example, transfer initiations systems 124a, 124b that initiate a transfer without using a token (e.g., by instead using traditional card information such as a PAN, expiry date, and/or CCV) may be required to include a "stored card" flag in a transfer request submitted to a transfer rail server 120 if the transfer initiation system 124a, 124b is storing a representation of a value transfer card. The transfer rail server 120 may store data identifying transfer initiation systems 124a, 124b that have indicated storage with such a flag. Thus, the transfer rail server may track transfer initiation systems that have stored a card-on-file representation of a value transfer card.

At operation 402, the issuer computer system authenticates a client device 150. More particularly, authentication is performed based on a credential provided by the client device to the issuer computer system 100. The credential may include any one or a combination of an access token, an account number such as a primary account number (PAN), a username, a password, a personal identification number, biometric data such as data representing a fingerprint, or a credential of another type. The issuer computer system receives the credential and uses the credential to authenticate the client device. In doing so, the issuer computer system may identify an account associated with the client device 150 and, more particularly, a value transfer card associated with the client device.

At operation 404, the issuer computer system may obtain stored card data from the transfer rail server. For example, the issuer computer system may send, via a communications module and to the transfer rail server, a request for stored card data associated with a value transfer card. The request may be in the form of a call to an application programming interface (API) provided by the transfer rail server, although other types of requests are also contemplated. In response to sending the request, the transfer rail server receives, via the communications module and from the transfer rail server, stored card data. The stored card data identifies one or more entities having a stored representation of a card. For example, the stored card data may identify one or more transfer initiation systems 124a, 124b having a stored representation of the value transfer card. The stored representations of the value transfer card may include a tokenized representation of the value transfer card. Additionally or alternatively, the stored representations of the value transfer card may include a card-on-file representation of the value transfer card.

The stored card data may indicate a representation type for stored representations of the value transfer card. That is, the stored card data may indicate whether a particular entity (i.e., a particular transfer initiation system) has stored the value transfer card in a tokenized format or whether that entity has stored the value transfer card in a card-on-file format.

The stored card data may include identification information for each entity having a stored representation of the value transfer card. For example, the identification information may be a name or other identifier of an entity/transfer initiation system.

At operation 406, the issuer computer system provides a card management user interface to the client device that was authenticated at operation 402. For example, the issuer computer system may provide user interface data to the client device. The user interface data is data that may be configured to cause the client device to display or otherwise output a user interface, which may be referred to as a card management user interface. The user interface includes a selectable option to add an entity-based control to an identified entity. That is, the user interface includes a selectable option to add an entity-based control to an entity identified in the stored card data.

Figure 5:
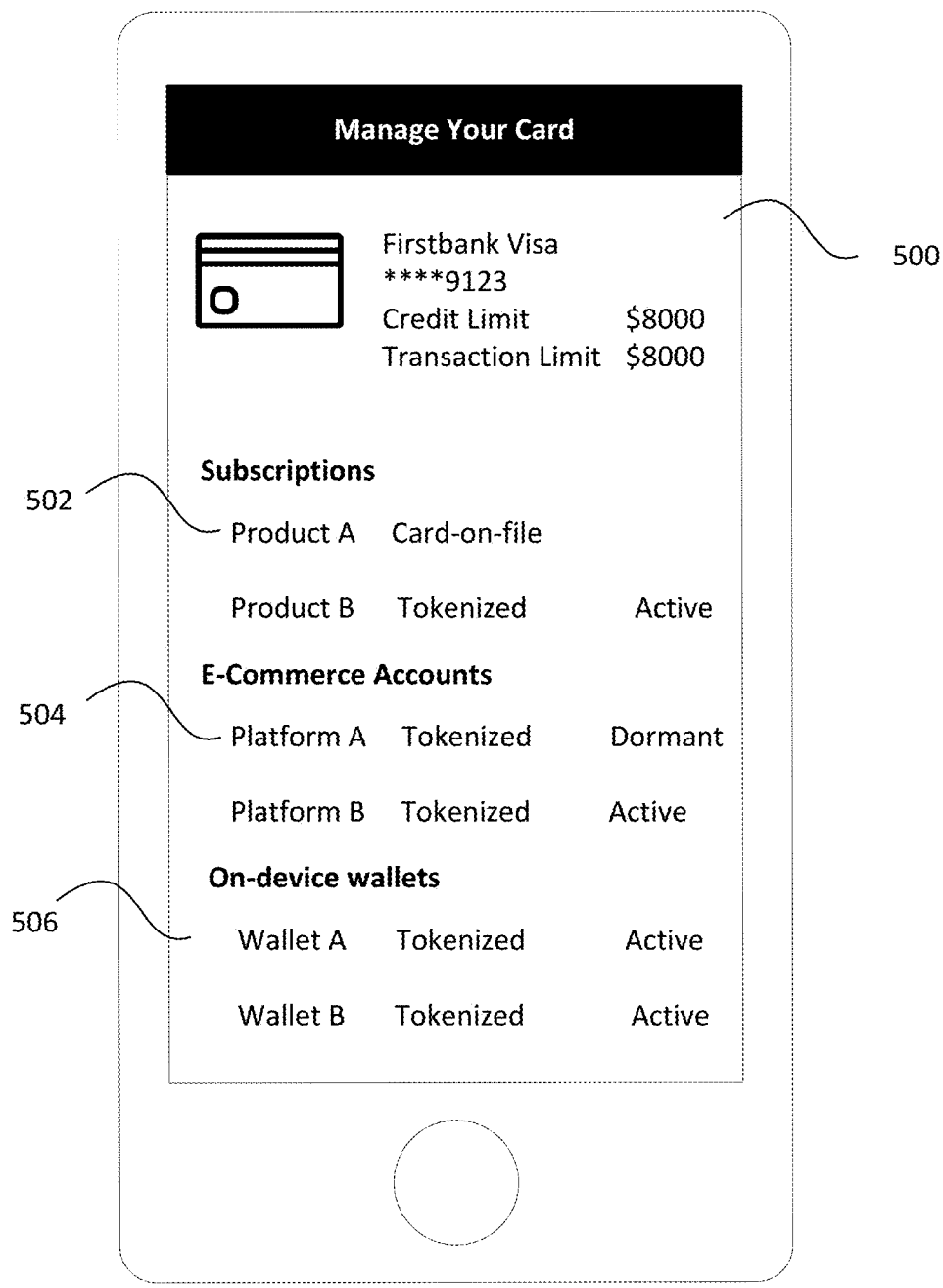
FIG. 5 shows a display screen of a card management user interface.
Figure 6:
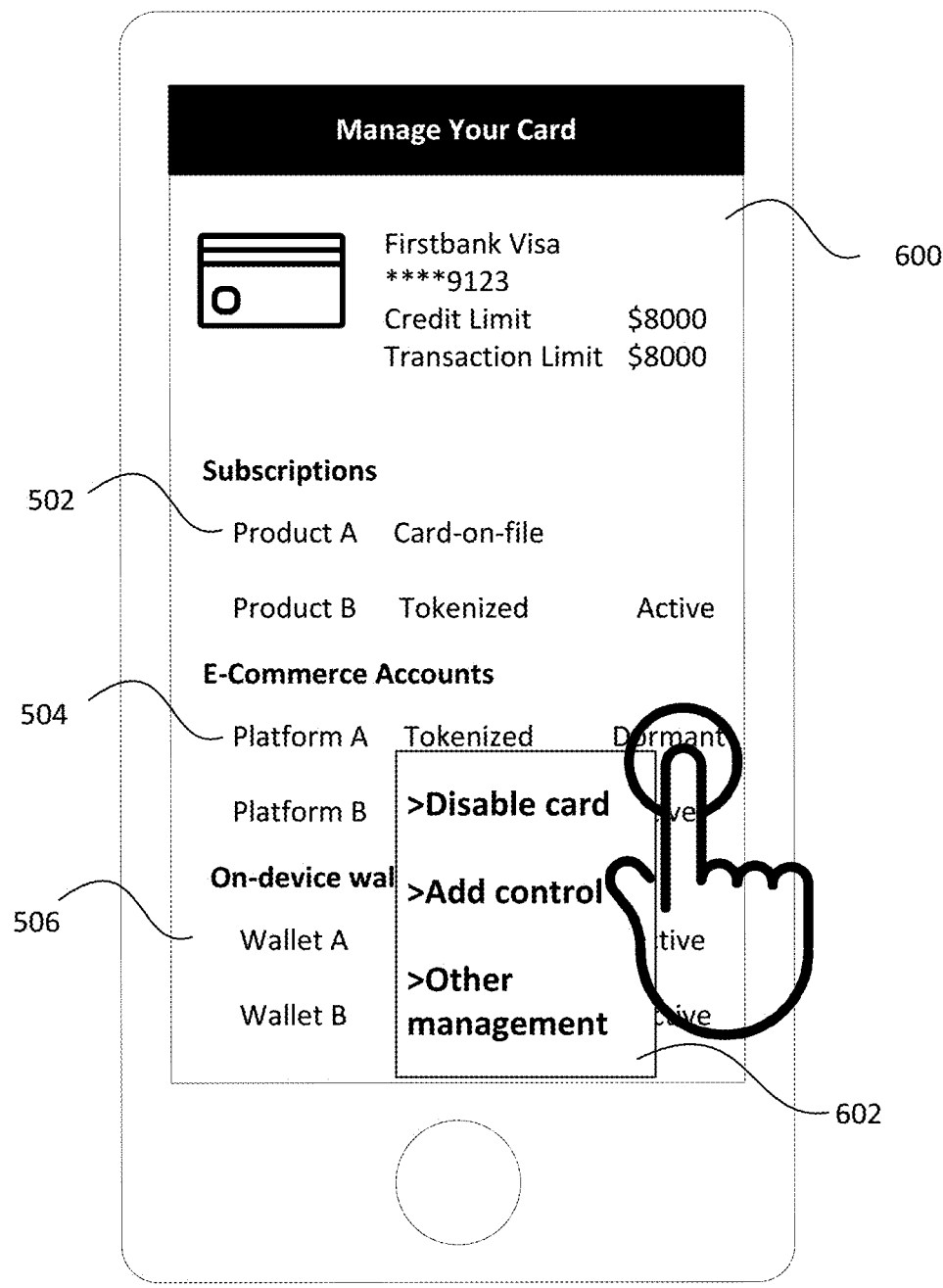
FIG. 6 shows a display screen of a card management user interface.
Figure 7:
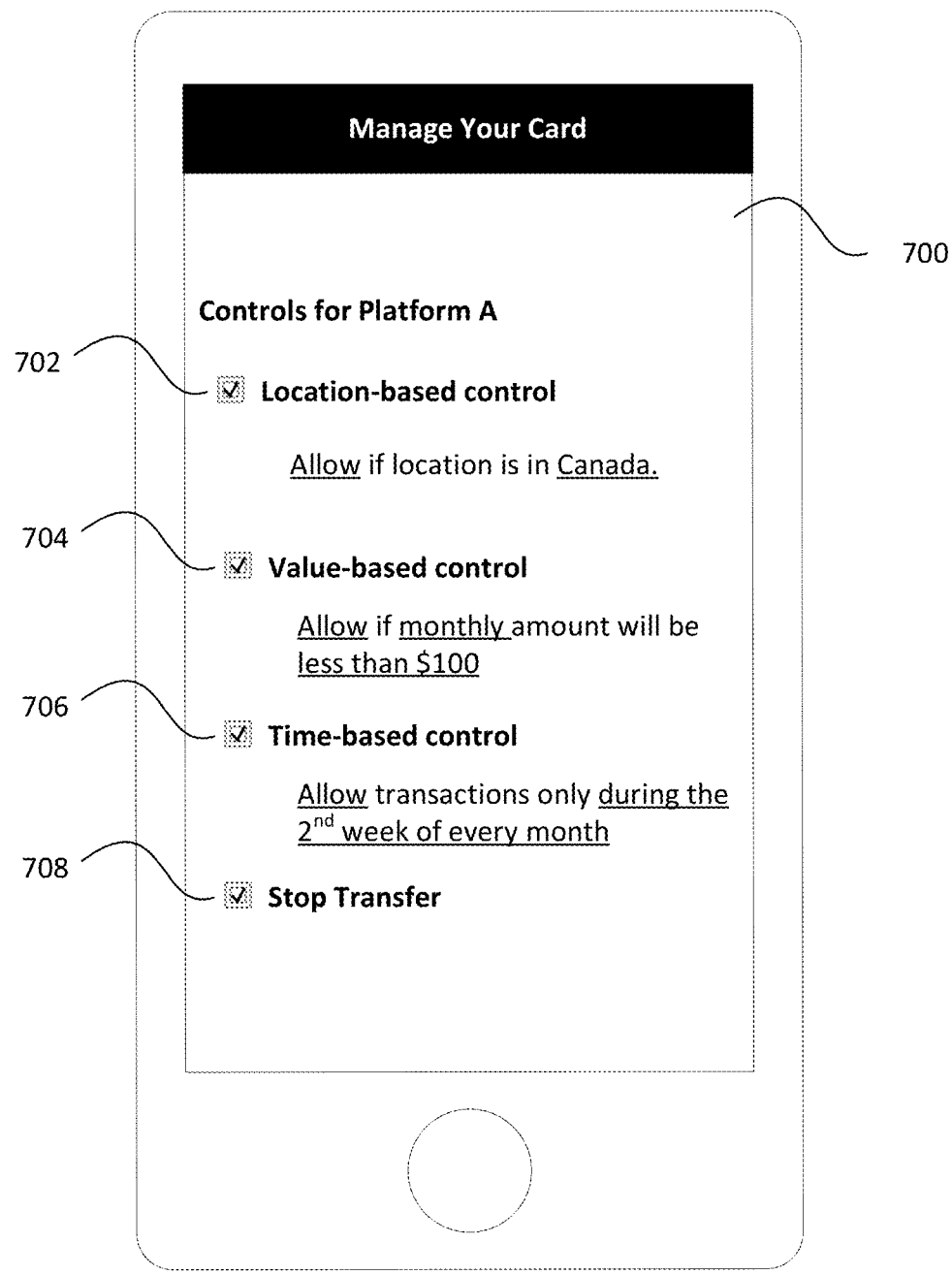
FIG. 7 shows a display screen of a card management user interface.

Reference will be made to FIGS. 5 to 7 which illustrate example display screens 500, 600, 700 of a card management user interface. The card management user interface may be displayed on a client device 150 (FIG. 1).

Referring first to FIG. 5, the example display screen 500 includes identifying information, such as a value transfer card type (e.g., Firstbank Visa™). The example display screen 500 also identifies value transfer card parameters such as a credit limit and a transaction limit.

The example display screen also identifies entities having a stored representation of the value transfer card. In the example, such entities are displayed by entity type. For example, subscription services are displayed in a first area 502 and e-commerce services are displayed in a second area 504. The classification of entities may be performed, for example, by the issuer computer system performing the method 400. For example, the issuer computer system may maintain data mapping entities to categories and such data may be used by the issuer computer system in generating the user interface data that is used by the client device for displaying the card management user interface. In other embodiments, the classification may be performed by the client device 150 itself. In at least some embodiments, the classification may be based on user preferences such as user-defined classes.

The card management user interface, in the example, also includes representations of the value transfer card that are stored on-device (e.g., on the client device 150 itself). By way of example, such representations may include mobile wallet representations of the value transfer card. Such mobile wallets may include, for example, Google Pay™ and Apply Pay™. The example on-device representations of the value transfer card are displayed in a third area 506 of the example display screen 500.

In the example, the on-device representations of the value transfer card are displayed concurrently with off-device stored representations of the value transfer card. That is, the on-device representations are displayed together with a listing of third party entities that have also stored a representation of the value transfer card.

The on-device representations of the value transfer card may also be identified in the stored card data that the issuer computer system receives from the transfer rail server 120 and may be represented in the user interface data that is sent from the issuer computer system to the client device at operation 406. Additionally or alternatively, the client device may obtain an indication of the on-device representations of the value transfer card based on on-device data.

In the example illustrated, the card management user interface concurrently identifies entities having stored a tokenized representation of the value transfer card and entities having stored a non-tokenized representation of the value transfer card (e.g., a card-on-file representation). The user interface indicates the representation type (e.g., whether the value transfer card is represented by a token or as a card-on-file). In the example illustrated, the card management user interface also identifies an operating state for each entity. For example, some entities are listed as being "active" while others may be listed as "dormant". A dormant entity is one that has not used the value transfer card in a while (i.e., a threshold period of time has elapsed since a last use). Other operating states may be listed apart from those identifies in FIG. 5. For example, a disabled operating state may be identified for entities that have been restricted from further using the value transfer card.

The card management user interface may provide card management controls. For example, one or more selectable options may be provided on the card management user interface for inputting a card management instruction. The selectable options may be provided, for example, using one or more interface elements. The interface elements may include, for example, virtual buttons.

In at least some embodiments, the card management user interface may provide different card management controls for an entity having stored a tokenized representation of a value transfer card than for an entity having stored a non-tokenized representation of the value transfer card. Additionally or alternatively, the card management user interface may provide card management controls for an entity having stored a tokenized representation of a value transfer card but not for an entity having stored a non-tokenized representation of the value transfer card. For example, an entity listing displayed by the card management user interface may include an entity having stored a tokenized representation of the value transfer card and an entity having stored a non-tokenized representation of the value transfer card and a selectable option to add the entity-based control may be provided for the entity having stored the tokenized representation of the value transfer card but not the entity having stored the non-tokenized representation of the value transfer card.

Referring to FIG. 6, an example display screen 600 of the card management user interface is illustrated. The example display screen 600 may be displayed when a user activates or otherwise selects one of the listed entities. In the example, such selection may be made using a touchscreen associated with the client device 150, although other selection techniques are contemplated. The example display screen 600 includes a listing 602 of one or more selectable card management operations. In the example, the options include a selectable option to add an entity-based control and a selectable option to disable a value transfer card. Other selectable options may be provided instead of or in addition to these options.

The options that are provided may depend on the entity selected. For example, the options that are provided in the display screen 600 may be based on an operating state for the selected entity. For example, a dormant entity may have different options than an active entity. By way of further example, a disabled entity may have different options than an active entity. For example, the disabled entity may have an option to re-enable whereas an active entity many have an option to disable.

Upon selection of the selectable option to add an entity-based control to an identified entity, the client device 150 may then display a display screen 700 (FIG. 7) for receiving configuration parameters associated with the entity-based control. Referring now to FIG. 7, an example of such a display screen 700 is illustrated. The display screen may be provided as part of the card management user interface.

The display screen includes interface elements for defining the nature of the entity-based control. For example, various entity-based controls may be implemented including, for example, location-based use restrictions 702, threshold-based use restrictions such as value-based restrictions 704, time-based restrictions 706 and/or a stop transfer control 708.

A location-based use restriction 702 is an entity-based control that prevents use of the value transfer card by the identified entity at a first location and allows use of the value transfer card by the identified entity at a second location. The first location may be, for example, a location associated with the identified entity. For example, the identified entry may be associated with a particular geographic area and the identified entity may only be permitted to use the value transfer card in that geographic area or within a threshold proximity of that geographic area. The geographic area may be defined in terms of one or more of a city, province, state and/or country. In at least some embodiments, when a transfer initiation system 124a, 124b issues a transfer request to a transfer rail server 120, it may be required to include a geographic indicator indicating a location from which the transfer request is initiated. Ordinarily, the geographic area may be used for limited purposes such as, for example, fraud detection. However, when a location-based use restriction 702 is in place, the transfer request will only be approved if it complies with the location-based use restriction.

Parameters associated with a location-based use restriction 702 may be user-defined in at least some embodiments. For example, the example display screen 700 allows a user to input whether the control is a whitelist rule or a blacklist rule (e.g., whether the rule is one that will allow transactions from defined locations or deny transactions from defined locations). The example display screen 700 further allows a user to define the location associated with the location-based use restriction.

By way of example, in at least some embodiments, an entity-based control may be defined which is a location-based use restriction that prevents use of the value transfer card by the identified entity outside of a home country associated with the identified entity.

The stop transfer control 708 is a control that prohibits the identified entity from processing a transfer using the value transfer card until the stop transfer control is removed.

The card management user interface may allow for configuration of an entity-based control which is a threshold-based use restriction. A threshold-based use restriction is a control that is based on a threshold. The threshold-based use restriction may be a value-based restrictions 704. For example, the threshold may define a maximum transfer value for a time period or for a single transfer of value (i.e., a single transaction). Parameters associated with a value-based restriction 704 may be user-defined in at least some embodiments. For example, the example display screen 700 allows a user to input an indication of whether the control is a control to allow (based on defined parameters) or a control to deny (based on defined parameters). The display screen 700 also allows a user to define a time-period associated with the value-based restriction (e.g., whether the value is assessed based on a single-transfer or based on the cumulative value of transfers over a defined period such as monthly, daily, etc.). The display screen 700 also allows a user to define a value threshold (e.g., $100 in the example) and/or a comparator operation (e.g., greater than (>), less than (<), greater than or equal to (>=), or less than or equal to (<=)).

The card management user interface may allow for configuration of an entity-based control which is a time-based restriction. A time-based use restriction is a control that prevents use of the value transfer card by the identified entity on a first date and allows the user of the value transfer card by the identified entity on a second date. By way of example, the entity-based control may specify one or more of: a date on which the value transfer card may be used by the identified entity; a range of dates on which the value transfer card may be used by the identified entity; an end date after which the value transfer card may not be used by the identified entity; and a recurring date range during which the value transfer card may be used by the identified entity.

Parameters associated with a time-based restriction may be user-defined in at least some embodiments. For example, the example display screen 700 allows a user to input an indication of whether the control is a control to allow or a control to deny. The display screen 700 also allows a user to define a time-period.

Referring again to FIG. 4, the method 400 may include, at operation 408, receiving, via the communications module and from the client device, an instruction to apply an entity-based control to an identified one of the entities in the stored card data. The instruction may include parameters such as one or more of the parameters that may have been defined using the display screen 700 of FIG. 7. By way of example, the instruction may include a threshold. Thus, the nature of the entity-based control is received at the issuer computer system.

Then, at operation 410, in response to receiving the instruction to apply the entity-based control, the issuer computer system implements the entity-based control to affect use of the value transfer card by the identified entity and not affect use of the value transfer card by other entities. That is, the entity-based control only attaches or applies to its associated entity. It does not affect any other entities.

In some embodiments, the issuer computer system may use the entity-based control to process future transfer requests from the identified entity. For example, each time a transfer request is received, it may be evaluated against the entity-based control in order to determine whether the request is to be approved or denied. For example, where approval of the request would violate the entity-based control, the transfer request may be denied.

In some implementations, at operation 410 implementing the entity-based control to affect use of the value transfer card by the identified entity may include sending, to the transfer rail server, an instruction to apply the entity-based control. The instruction may identify the identified entity and the value transfer card. The instruction may also include the parameters associated with the control (e.g., the user-defined parameters). The transfer rail server may then use the entity-based control to evaluate transfer requests. For example, where approval of the request would violate the entity-based control, the transfer request may be automatically denied. That is, such a request may be denied without even passing the request onto the issuer computer system for approval. Notably, by denying the request at the transfer rail server, at least some communications to the issuer computer system may be avoided. This may speed up processing of at least some transfer requests.

After the entity-based control is implemented, the issuer computer system may, at operation 412, update the card management user interface at the client device 150 to indicate that the entity-based control has been applied and to include a selectable option to remove the entity-based control.

Figure 8:
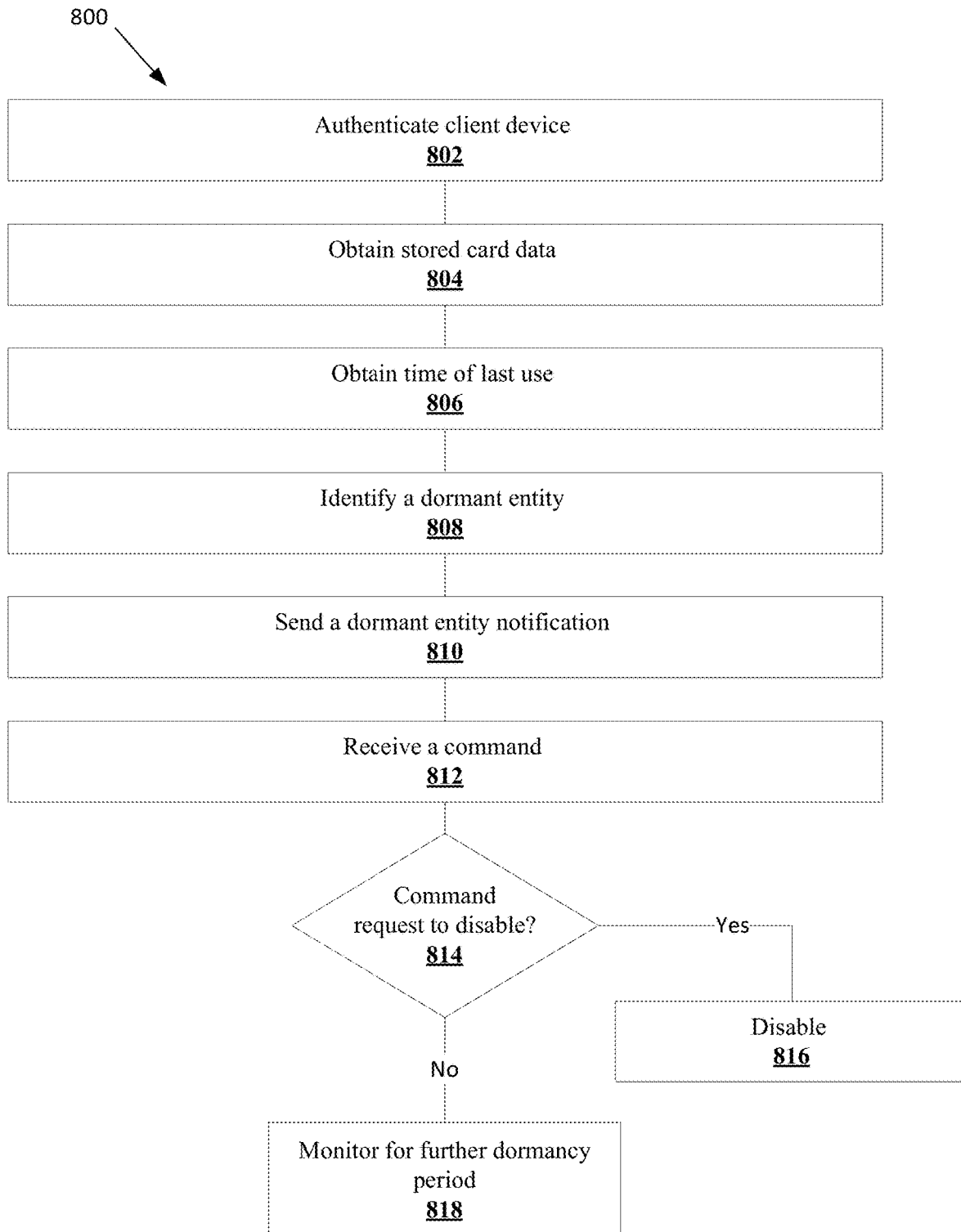
FIG. 8 is a flowchart showing operations performed by an issuer computer system.

Reference will now be made to FIG. 8. FIG. 8 provides a flowchart depicting example operations performed in a method 800 of managing a card stored remotely by a third party entity. The third party entity may be a transfer initiation system 124a, 124b having a stored representation of a value transfer card.

Operations starting with an operation 802 and continuing onward are performed by the processor 210 (FIG. 2) of a computing device 200 executing software comprising instructions such as may be stored in the memory 220 of the computing device 200. For example, the operations of the method 800 may be performed by the issuer computer system 100. More particularly, processor-executable instructions may, when executed, configure a processor 210 of the issuer computer system 100 to perform the method 800.

In performing the method 800, the issuer computer system 100 may cooperate with a transfer rail server 120. The transfer rail server may store card data for a value transfer card. The card data may be or include card data of the type described above. In at least some embodiments, the card data may include or be associated with data indicating a time of last use of a value transfer card by entitles having stored representations of the value transfer card. The time of last use may include a date and/or clock time. The time of last use may be a time of a last transfer request issued by an associated entity using the value transfer card.

At operation 802, the issuer computer system 100 authenticates a client device 150. Operation 802 may be performed in the manner described above with reference to operation 402 of the method 400.

At operation 804, the issuer computer system 100 obtains, via the communications module and from a transfer rail server, stored card data. The stored card data identifies one or more entities having a stored representation of a value transfer card. Operation 804 may be performed in the manner described above with reference to operation 404 of the method 400.

At operation 806, the issuer computer system 100 obtains, via the communications module and from the transfer rail server, data indicating a time of last use of the value transfer card by one or more of the identified entities. Operation 806 may include both sending a request for the data indicating a time of last use and receiving the data indicating the time of last use. The request for the data indicating a time of last use may be an API call. The request may be a request for a specified entity or a request to provide a time of last use for all entities having a stored representation of the value transfer card.

While operation 806 is illustrated separately from operation 804, in some implementations, they may be provided together. That is, the stored card data and the associated times of last use for the associated entities may be provided together (e.g., in response to a single request from the issuer computer system 100).

At operation 808, the issuer computer system 100 identifies a dormant entity. The identification of the dormant entity may be based on the data indicating the time of last use of the value transfer card by the one or more of the identified entities. For example, a dormant entity may be identified by performing a threshold-based comparison based on the time of last use and a current date.

The threshold may be a static threshold or a dynamic threshold. A static threshold is one that does not change. That is, the same threshold may be used to evaluate all entities for dormancy. A dynamic threshold is a threshold that is determined for a specific entity and that may be different for a first entity and a second entity. The dynamic threshold for an entity may be determined based on, for example, a transaction history associated with that entity. For example, a cadence, period or frequency of past transactions may be used to determine the dormancy period. The dormancy threshold may be set to, for example, be greater than the typical period between past transactions. For example, for an entity that previously processed transactions monthly, the dormancy threshold may be set to be at least greater than one month (e.g., it might be 2 months). However, for an entity that previously processed transactions weekly, the dormancy threshold may be set to be at least greater than weekly (e.g., it may be 2 weeks). By way of example, the dormancy threshold for an entity may be determined as a defined multiple of a past transaction period for that entity.

The threshold used to identify dormancy may be based on or defined by a user-inputted preference. For example, the issuer computer system may receive, from the authenticated client device, input of a threshold for identifying a dormant entity and the identifying performed at operation 808 may be based on the input threshold.

When a dormant entity is identified, the issuer computer system may send (at operation 810), via the communications module and to the client device associated with the value transfer card (i.e., the authenticated client device), a notification of the dormant entity. The notification may provide a prompt to disable the value transfer card for the dormant entity.

The notification may take a variety of forms. For example, in some embodiments, the notification may be provided on a card management user interface such as the dormancy operating status indicated on the example display screen 500 of FIG. 5. In some embodiments, the notification may be a pop-up message. Other types of notifications are also possible.

The dormant entity for which the notification is sent may be an entity having stored a tokenized representation of the value transfer card. In some implementations, notifications of dormant entities are only sent for entities having stored tokenized representations of the value transfer card. Put differently, such notifications may not be sent for entities having stored a card-on-file representation of the value transfer card. Accordingly, operation 810 (and, in at least some embodiments, operation 808) may only be performed for entities having stored a tokenized representation of the value transfer card.

In some embodiments, the notification may be provided in response to another trigger condition. For example, the notification may be held until the trigger condition is satisfied and then may be provided to the client device. For example, the notification may be provided when the user launches a particular application on the client device. By way of example, the notification may be provided when the client device displays the card management user interface or a particular display screen of the card management user interface, such as a display screen of the type described with reference to the example display screen 500 of FIG. 5.

The notification provides a prompt on the client device to disable the value transfer card for the dormant entity. For example, the notification may include a selectable option to disable the value transfer card. Selection of the selectable option may, for example, cause the client device to send, to the issuer computer system, a command to disable the value transfer card for the dormant entity.

The notification may include prompts for other operations associated with the dormant entity. For example, the notification may include a selectable option to dismiss the prompt. By way of further example, the notification may include a selectable option to snooze the notification.

The notification may specify a time of last use or a dormancy period (e.g., "Platform A hasn't used the value transfer card in 183 days" or "Platform A hasn't used the value transfer card since Jan. 10, 2018).

At operation 812, the issuer computer system receives, via the communications module and from the client device, a command in response to the notification. The issuer computer system may perform operations that depend on the nature of the command. For example, at operation 814, the issuer computer system may determine whether the command includes a request to disable the value transfer card for the dormant entity. When the command includes a request to disable the value transfer card for the dormant entity, the issuer computer system may, at operation 816, disable the value transfer card for the dormant entity to prevent further use of the value transfer card by the dormant entity. Disabling the value transfer card for the dormant entity only prevents use of the value transfer card by the dormant entity; it does not affect use of the value transfer card by other entities. For example, the particular token associated with the dormant entity may be disabled but other tokens issued to other entities may not be disabled.

Disabling the value transfer card may be performed in a variety of manners. For example, the issuer computer system may store a processing restriction in memory. The processing restriction may be used, by the issuer computer system, in processing future transfer requests. Specifically, the processing restriction may prevent any transfer requests submitted by the dormant entity from being approved.

In some implementations, disabling the value transfer card for the dormant entity may include sending, to the transfer rail server, an instruction to disable the value transfer card for the dormant entity. The instruction may, for example, be sent to the transfer rail server using an API provided by the transfer rail server. For example, an API call may identify the value transfer card and the dormant entity and may include an instruction to disable the identified value transfer card for the identified dormant entity. The transfer rail server may then disable the value transfer card by, for example, disabling or revoking the token that represents the value transfer card for that entity. Additionally or alternatively, the disabling of the value transfer card may be performed by placing a stop transfer control on the representation of the value transfer card stored by the dormant entity.

After the value transfer card has been disabled for the entity, the issuer computer system may send a message to the client device indicating that the value transfer card has been disabled. The message may, for example, cause the client device to display a confirmation of disablement.

If, the command received at operation 812 is not a command to disable the value transfer card (e.g., if it is a command to snooze the reminder and/or if it is a command to dismiss the reminder), the issuer computer system may take another action. For example, at operation 818, the issuer computer system may monitor for a further dormancy period.

For example, the issuer computer system may, when the command is not a request to disable the value transfer card for the dormant entity, later obtain, from the transfer rail server and via the communications module, further data indicating an updated time of last use of the value transfer card by one or more of the identified entities. Such obtaining may be performed at some fixed time in the future (e.g., in a week, month, etc.) and the period of time may be based on user input. Then, the issuer computer system may evaluate whether the identified entity has entered a further dormancy period, For example, the issuer computer system may determine that the dormant entity for which the notification was sent has entered a further dormancy period by performing a threshold-based comparison based on the updated time of last use, the current date, and a second threshold. The second threshold may represent a longer time period than the first threshold. In some implementations, when the further dormancy period is entered, the issuer computer system may take further action such as re-notifying the client device (e.g., performing operation 810) or by automatically disabling the value transfer card for the dormant entity (e.g., by performing operation 816 without specific user input of an instruction to do so). Where the issuer computer system re-notifies the client device, the further notification may provide a further prompt to disable the value transfer card for the dormant entity.

In some instances, the command received at operation 812 may be a snooze command. After receiving the snooze command the issuer computer system may, following a snooze period, determine whether the dormant entity remains dormant. The snooze period may be based on user input. For example, the snooze command may include a time period (e.g., snooze for a day, week, month, etc.) which defines the snooze period.

After the snooze period elapses, the issuer computer system may obtain further data from the transfer rail server. For example, a further time of last use of the value transfer card by the dormant entity may be obtained. The further time of last use may be used to determine whether the dormant entity has remained dormant. When the issuer computer system determines that the dormant entity has remained dormant, it may send a further notification of the dormant entity to the client device associated with the value transfer card. The further notification provides a further prompt to disable the value transfer card for the dormant entity. The further notification may be of the same type as described above with reference to operation 810.

The example card management user interface described above in relation to FIGS. 5 to 7, or a portion thereof, may also be used with the method 800 of FIG. 8. For example, in at least some embodiments, the dormant entity notification provided at operation 810 may have been provided on a card management user interface such as the example display screen 500 of FIG. 5. For example, operation 406 of the method 400 of FIG. 4 may be performed as part of the method 800 of FIG. 8. That is, the issuer computer system may provide user interface data to the client device which causes the client device to display a user interface that includes an entity listing identifying entities having a stored representation of a value transfer card. The entity listing may include the dormant entity and the user interface may include a dormant card indication in association with the dormant entity. In the example of FIG. 5, the dormant card indication is an indication marked "dormant" and, in the example, applies to an entity identified as "Platform A".

Figure 9:
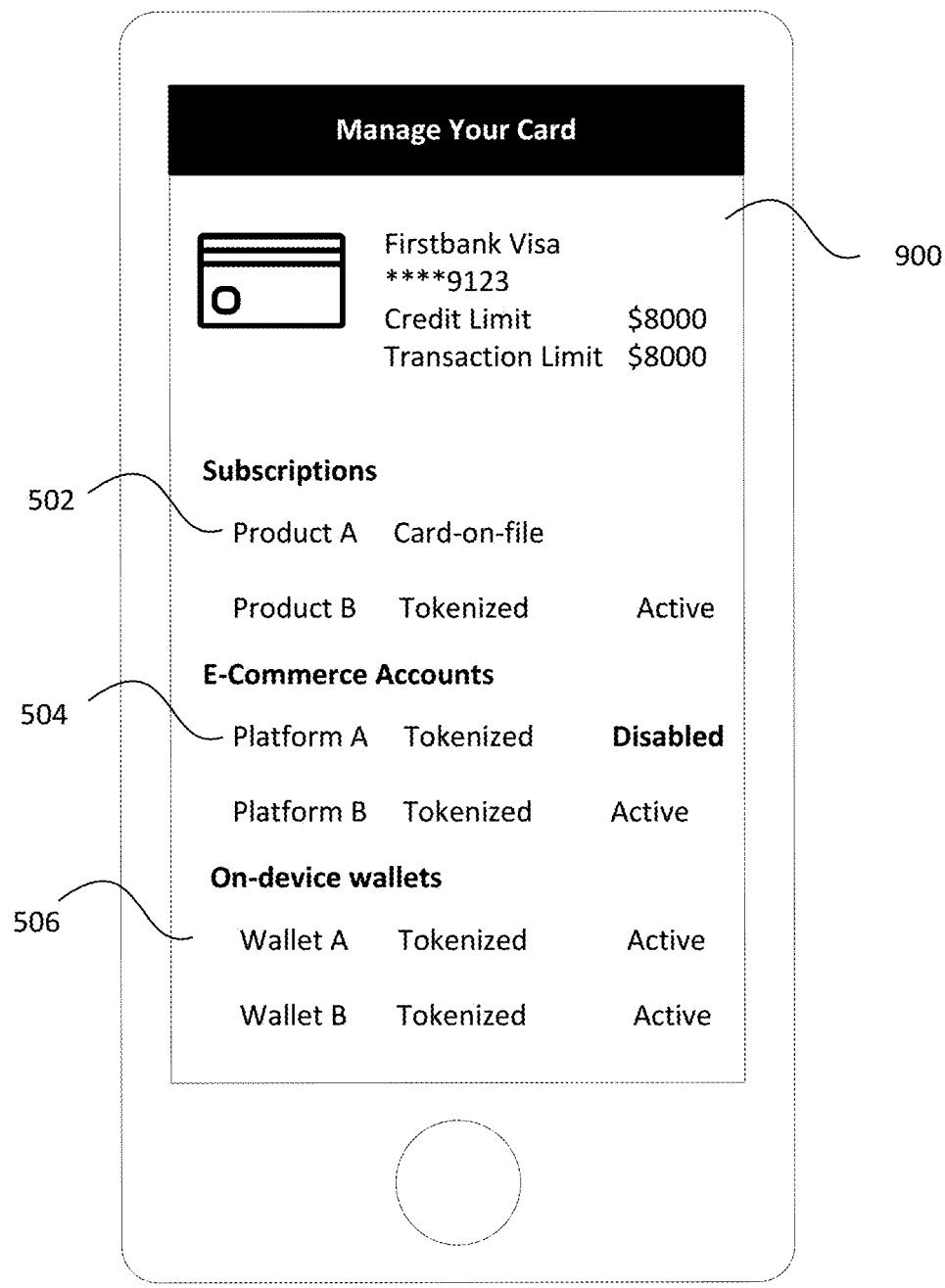
FIG. 9 shows a display screen of a card management user interface.

The dormant entity may be selectable and, upon selection, the display screen 600 of FIG. 6 may be displayed. The display screen 600 of FIG. 6 provides a prompt to disable the dormant card and, upon selection of the selectable option to disable the dormant card, the command to disable the card may be sent to the issuer computer system. Then, as illustrated in FIG. 9, a further display screen 900 may be displayed on the client device. The further display screen confirms that the value transfer card has been disabled. The card management user interface may then provide a selectable option to re-enable the value transfer card for the entity. For example, selection of the disabled value transfer card may cause a display screen 600 of the type described above with reference to FIG. 6 to be displayed. Such a display screen may include, in the listing 602 of one or more selectable card management operations, a selectable option to re-enable the value transfer card for the entity. Selection of such a selectable option may cause a re-enable command to be sent to the issuer computer system which may then re-enable the value transfer card (e.g., by performing operations that reverse those performed in operation 816).

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computing system comprising:
a communications module;
a processor coupled to the communications module; and a memory coupled to the processor, the memory storing processor-executable instructions which, when executed, configure the processor to:
  send, via the communications module and to a transfer rail server, a request for stored card data associated with a value transfer card;
  receive, via the communications module and from the transfer rail server, stored card data, the stored card data identifying an entity having stored a unique tokenized representation of the value transfer card, wherein the unique tokenized representation is issued to the entity by a tokenization service, the tokenization service storing a mapping of the tokenized representation to the value transfer card;
  provide user interface data to a client device, the user interface data causing the client device to display a user interface that includes an entity listing that is based on the stored card data, the entity listing including an entity having stored a unique tokenized representation of the value transfer card, the user interface including a selectable option to add an entity-based control to the entity having stored the unique tokenized representation of the value transfer card and the user interface enabling input of one or more configuration parameters to be associated with an entity-based control;
  receive, via the communications module and from the client device, an instruction to apply an entity-based control to an identified one of the entities in the stored card data and one or more configuration parameters associated with the entity-based control, wherein the entity-based control includes a location-based use restriction that prevents use of the value transfer card by the identified entity at a first location and allows use of the value transfer card by the identified entity at a second location; and
  in response to receiving the instruction to apply the entity-based control, implement the entity-based control to affect use of the value transfer card by the identified entity and not affect use of the value transfer card by other entities by:
    sending an instruction to a transfer rail server to apply the entity-based control to the unique tokenized representation of the value transfer card for the identified entity, the instruction including the one or more configuration parameters, the instruction including the location-based use restriction, wherein the transfer rail server is configured to, in response to receiving the instruction, use the entity-based control to evaluate subsequent transfer requests from the identified entity based on the one or more configuration parameters and the location-based use restriction, the evaluation including:
      determining that a geographic indicator indicating a location from which the transfer request is initiated has been received from a transfer initiation system; and
      determining that the geographic indicator complies with the location-based use restriction; and
    wherein the instruction does not cause the transfer rail server to apply the entity-based control to other entities apart from the identified entity.

2. The computing system of claim 1, wherein implementing the entity-based control to affect use of the value transfer card by the identified entity comprises:
  sending, to the transfer rail server, an instruction to apply the entity-based control, the instruction identifying the identified entity and the value transfer card.

3. The computing system of claim 1, wherein the entity-based control includes a stop transfer control that prohibits the identified entity from processing a transfer using the value transfer card until the stop transfer control is removed.

4. The computing system of claim 1, wherein the first location includes a location associated with the identified entity.

5. The computing system of claim 1, wherein the entity-based control prevents use of the value transfer card by the identified entity outside of a home country associated with the identified entity.

6. The computing system of claim 1, wherein the entity-based control includes a control based on a threshold, and wherein the threshold is included in the instruction to apply the entity-based control.

7. The computing system of claim 6, wherein the threshold defines a maximum transfer value for a time period.

8. The computing system of claim 6, wherein the threshold defines a maximum transfer value for a single transfer of value.

9. The computing system of claim 1, wherein the entity-based control includes a time-based restriction preventing use of the value transfer card by the identified entity on a first date and allowing the use of the value transfer card by the identified entity on a second date.

10. The computing system of claim 9, wherein the entity-based control specifies one or more of:
  a date on which the value transfer card may be used by the identified entity;
  a range of dates on which the value transfer card may be used by the identified entity;
  an end date after which the value transfer card may not be used by the identified entity; and
  a recurring date range during which the value transfer card may be used by the identified entity.

11. The computing system of claim 1, wherein the instructions further configure the processor to update the user interface at the client device to indicate that the entity-based control has been applied and to include a selectable option to remove the entity-based control.

12. A method comprising:
  sending, to a transfer rail server, a request for stored card data associated with a value transfer card;
  receiving, from the transfer rail server, stored card data, the stored card data identifying an entity having stored a unique tokenized representation of the value transfer card, wherein the unique tokenized representation is issued to the entity by a tokenization service, the tokenization service storing a mapping of the tokenized representation to the value transfer card;
  providing user interface data to a client device, the user interface data causing the client device to display a user interface that includes an entity listing that is based on the stored card data, the entity listing including an entity having stored a unique tokenized representation of the value transfer card, the user interface including a selectable option to add an entity-based control to entity having stored the unique tokenized representation of the value transfer card and the user interface enabling input of one or more configuration parameters to be associated with an entity-based control;
  receiving, from the client device, an instruction to apply an entity-based control to an identified one of the entities in the stored card data and one or more configuration parameters associated with the entity-based control, wherein the entity-based control includes a location-based use restriction that prevents use of the value transfer card by the identified entity at a first location and allows use of the value transfer card by the identified entity at a second location; and in response to receiving the instruction to apply the entity-based control, implementing the entity-based control to affect use of the value transfer card by the identified entity and not affect use of the value transfer card by other entities by:

sending an instruction to a transfer rail server to apply the entity-based control to the unique tokenized representation of the value transfer card for the identified entity, the instruction including the one or more configuration parameters, the instruction including the location-based use restriction, wherein the transfer rail server is configured to, in response to receiving the instruction, use the entity-based control to evaluate subseequent transfer requests from the identified entity based on the one or more configuration parameters and the location-based use restriction, the evaluation including:

determining that a geographic indicator indicating a location from which the transfer request is initiated has been received from a transfer initiation system; and determining that the geographic indicator complies with the location-based use restriction; and wherein the instruction does not cause the transfer rail server to apply the entity-based control to other entities apart from the identified entity.

13. The method of claim 12, wherein implementing the entity-based control to affect use of the value transfer card by the identified entity comprises:

sending, to the transfer rail server, an instruction to apply the entity-based control, the instruction identifying the identified entity and the value transfer card.

14. The method of claim 12, wherein the entity-based control includes a stop transfer control that prohibits the identified entity from processing a transfer using the value transfer card until the stop transfer control is removed.

15. The method of claim 12, wherein the first location includes a location associated with the identified entity.

16. The method of claim 12, wherein the entity-based control prevents use of the value transfer card by the identified entity outside of a home country associated with the identified entity.

17. The method of claim 12, wherein the entity-based control includes a control based on a threshold, and wherein the threshold is included in the instruction to apply the entity-based control.

18. A non-transitory computer-readable storage medium comprising processor-executable instructions which, when executed, configure a processor to:

send, to a transfer rail server, a request for stored card data associated with a value transfer card;

receive, from the transfer rail server, stored card data, the stored card data identifying an entity having stored a unique tokenized representation of the value transfer card, wherein the unique tokenized representation is issued to the entity by a tokenization service, the tokenization service storing a mapping of the tokenized representation to the value transfer card;

provide user interface data to a client device, the user interface data causing the client device to display a user interface that includes an entity listing that is based on the stored card data, the entity listing including an entity having stored a unique tokenized representation of the value transfer card, the user interface including a selectable option to add an entity-based control to the entity having stored the unique tokenized representation of the value transfer card and the user interface enabling input of one or more configuration parameters to be associated with an entity-based control;

receive, from the client device, an instruction to apply an entity-based control to an identified one of the entities in the stored card data and one or more configuration parameters associated with the entity-based control, wherein the entity-based control includes a location-based use restriction that prevents use of the value transfer card by the identified entity at a first location and allows use of the value transfer card by the identified entity at a second location; and in response to receiving the instruction to apply the entity-based control, implement the entity-based control to affect use of the value transfer card by the identified entity and not affect use of the value transfer card by other entities by:

sending an instruction to a transfer rail server to apply the entity-based control to the unique tokenized representation of the value transfer card for the identified entity, the instruction including the one or more configuration parameters, the instruction including the location-based use restriction, wherein the transfer rail server is configured to, in response to receiving the instruction, use the entity-based control to evaluate subseequent transfer requests from the identified entity based on the one or more configuration parameters and the location-based use restriction, the evaluation including:

determining that a geographic indicator indicating a location from which the transfer request is initiated has been received from a transfer initiation system; and determining that the geographic indicator complies with the location-based use restriction; and wherein the instruction does not cause the transfer rail server to apply the entity-based control to other entities apart from the identified entity.

* * * * *